Nov. 12, 1963    R. N. MITCHELL, JR., ETAL    3,110,208
APPARATUS FOR TRIMMING MARGINAL EDGES OF METAL STRIP
AND FOR CHOPPING MARGINAL TRIMMINGS
Filed Nov. 7, 1960

INVENTOR
RANDOLPH N. MITCHELL JR
JOSEPH N. EDWARDS

BY Glenn E. Jackson

ATTORNEY

United States Patent Office 3,110,208
Patented Nov. 12, 1963

3,110,208
APPARATUS FOR TRIMMING MARGINAL EDGES OF METAL STRIP AND FOR CHOPPING MARGINAL TRIMMINGS
Randolph N. Mitchell, Jr., La Grange, and Joseph N. Edwards, Brookfield, Ill., assignors to Reynolds Metals Company, Richmond, Va., a corporation of Delaware
Filed Nov. 7, 1960, Ser. No. 67,631
6 Claims. (Cl. 83—302)

This invention relates to an apparatus for trimming the margins of metal strip and for chopping or cutting the scrap marginal trimmings into short lengths during the same operation.

It has become the practice subsequent to the rolling of metal strip to trim the opposite marginal edges of the strip to cut off irregularities or serrations which, if permitted to remain on the strip, might result in cracks or splits extending for material distances into the body portion of the strip. This edge trimming operation is usually performed by rotary shearing cutters. The resultant marginal edge ribbons produced on each side of the metal strip by the edge trimming operation are usually subjected to a severing or chopping operation which chops the edge ribbons into a plurality of short pieces which can be readily handled. In effecting the chopping operation of the edge ribbon, the ribbon is sometimes conducted to a separate chopping or severing device spaced as much as several feet from the rotary shearing cutters which trim the marginal edges of the strip. Examples of such apparatus are shown, for example, by United States Patent 2,014,248, issued to Archibald D. Evans on September 10, 1935, and Patent 2,133,595, issued to George P. Thomas on October 18, 1938.

It is also known to provide scrap chopping knives or cutters for the edge ribbon which are mounted directly on the rotary shearing cutters which trim the edge ribbon from the body portion of the metal strip. An example of this type of construction is shown by Patent 2,203,738, issued to Leonard W. Nash, on June 11, 1940. The apparatus and method in which the edge ribbon is severed into short lengths by chopping knives mounted directly on the shearing cutters, as shown by the Nash patent, is greatly preferable to the use of chopping knives or cutters which are remotely situated from the rotary shearing knives or cutters, since the problem of conducting the edge ribbon from the rotary shearing cutters to the remotely spaced chopping knives is avoided in the Nash construction.

However, a fundamental problem which occurs with the use of scrap chopping knives which are mounted directly on the rotary shearing cutters in apparatus of the type hereinbefore used is that small projections or "chopper marks" are produced along the edge of the main body of the metal strip which remains after the edge ribbon has been trimmed off. These chopper marks constitute undesirable defects in the metal strip.

Another problem which has occurred using combined rotary shearing cutters and integral chopping knives of the type shown by Patent 2,203,738—Nash, is that the reaction of using such apparatus has tended to cause a transverse bow in the metal strip between oppositely disposed cutting shears. In order to minimize such transverse bow, it has been necessary to use top and bottom guides above and below the metal strip.

Also, in using the rotary cutting shears with integral chopping knives of the prior art, the edge of the metal strip remaining after the edge trimming operation has not been as smooth as desirable, and there has been a tendency of the strip to ripple or "go out of flat" along the edge during the trimming operation so as to adversely affect the trimming operation.

Accordingly, it is an object of this invention to provide an improved apparatus for severing the marginal edges of metal strip and for chopping the marginal ribbon produced thereby into short predetermined lengths, without having "chopper marks" along the edges of the main body of the metal strip.

It is another object of this invention to provide a combined edge trimming and scrap chopping apparatus which pulls the metal strip tightly from edge to edge to provide a flat sheet, thereby avoiding the use of top and bottom guides for the strip which have heretofore been required to oppose transverse bow between the oppositely disposed shearing cutters, and also avoiding a tendency of the metal strip to ripple along the edge being trimmed.

It is still another object of this invention to provide an apparatus for trimming metal strip which produces a much smoother edge on the body of the metal strip remaining after the edge has been trimmed than that produced by apparatus of the prior art.

In achievement of these objectives, there is provided in accordance with an embodiment of this invention a combined edge shearing and chopping assembly comprising a pair of vertically superposed rotary shearing cutters disposed adjacent each of the longitudinal edges of the metal strip to be trimmed, and chopping knives or cutters mounted on one of the shearing cutters of each pair to chop the edge ribbon into short predetermined lengths. The lateral spacing between the opposite pairs of rotary shearing cutters is such that the two opposite edges of the metal strip will respectively pass between the rotary shearing cutters of each pair of cutters.

In accordance with the invention, the rotary shearing cutters and scrap chopping knives of each assembly rotate in vertical planes perpendicular to the plane of the metal strip being operated on, but canted at a slight angle so as to diverge with respect to the line of travel of the metal strip.

The slight angular canting of the planes of the rotary shearing cutters and chopping knives carried thereby results in the chopping knives being slightly spaced from the adjacent edge of the main body of the strip at the location where the chopping occurs, with the result that no chopper marks appear on the main body of the strip as a result of the action of the chopping knives. Furthermore, the canted relation of the rotary shears and chopping knives carried thereby to the line of travel of the metal strip results in an outward thrust which tensions the strip from edge to edge and avoids the necessity for top and bottom guides above and below the surface of the metal strip to prevent transverse bowing of the strip between the oppositely disposed sets of rotary shearing cutters. The tensioning of the strip by the canted shearing cutter assembly also avoids a tendency of the strip to ripple along the edges being trimmed.

For a better understanding of the invention and its other objects, advantages and details, reference is now made to the present preferred embodiment of the invention which is shown, for purposes of illustration only, in the accompanying drawing. In the drawing.

Figure 1:
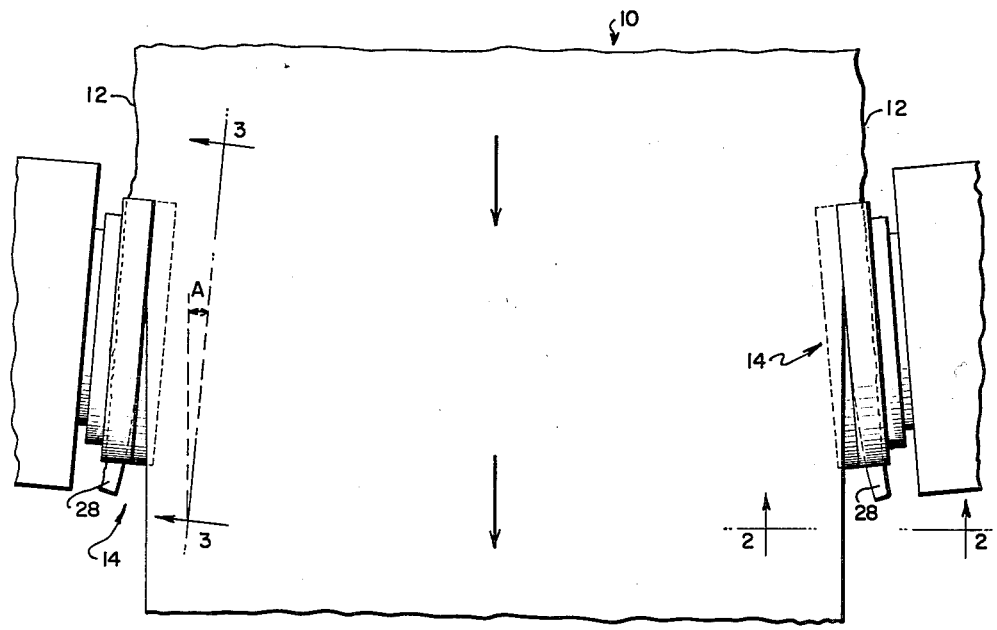
FIG. 1 is a top plan view of the metal trimming and scrap chopping apparatus of the invention operating upon a metal strip.

Referring now to FIG. 1, a strip of sheet metal generally indicated at 10 having two longitudinally extending edges 12 which are irregular and require edge trimming in accordance with well known practice. In order to trim the opposite edges of strip 10 and to chop the metal ribbon produced by the edge trimming, there is provided adjacent each of the opposite sides of strip 10 a combined edge trimming and scrap chopping apparatus generally indicated at 14. Each edge trimming and scrap chopping apparatus 14 is the same and a description of one will suffice for either.

Figure 3:
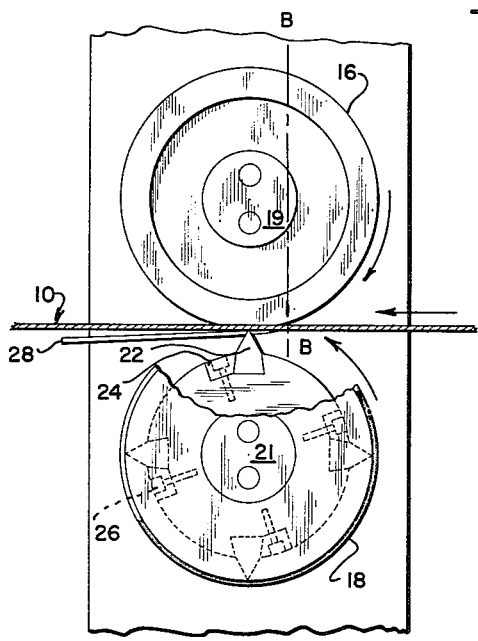
FIG. 3 is a view in vertical section along line 3—3 of FIG. 1.
Figure 2:
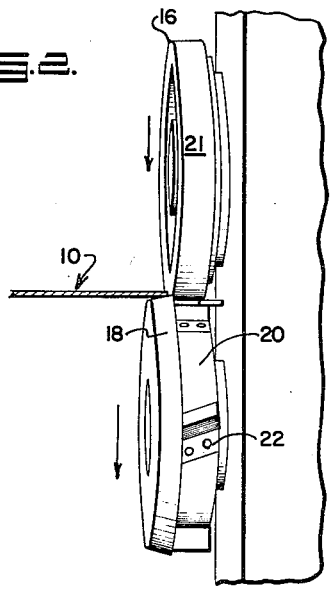
FIG. 2 is a view in vertical section along line 2—2 of FIG. 1.

Each apparatus 14 includes a pair of disc-like rotary shearing cutters 16 and 18 which respectively lie above and below the horizontal plane of the metal strip being operated on, the metal strip being fed so that the opposite edges being trimmed pass between the shearing cutters 16 and 18 adjacent each edge. Each assembly 14 may be considered to lie in a single vertical plane defined by the contiguous parallel vertical planes of the shearing cutters 16 and 18 of the respective assembly. Shearing cutters 16 and 18 are mounted in keyed relation to and rotate with arbors 19 and 21 which, in turn, may be driven by any suitable driving mechanism. Cutters 16 and 18 engage the strip 10 and shear the edge ribbon 23 at the vertical plane indicated at B—B in FIG. 3, ahead of the vertical center line of cutters 16 and 18. The distance of plane B—B from the center line of the cutters varies with the thickness, alloy, temper, and temperature of the strip 10, as well as with the lap, clearances, and keenness of the rotary shearing cutters 16 and 18.

The lower rotary shearing cutter 18 includes a hub 22 which lies below the peripheral surface 21 of the upper shearing cutter 16, hub 20 carrying thereon a plurality of circumferentially spaced chopping knives or blades 22. The embodiment shown in the drawing includes four chopping knives or blades 22. The chopping knives 22 may be secured in position by means of wedge members 24 which, in turn, are secured in position by screws 26. The peripheral surface 21 of rotary shearing cutter 16 serves as an anvil for scrap chopping knives 22. The chopping knives 22 engage and sever the edge ribbon 23 substantially at the vertical center line of the rotary shearing cutters 16 and 18.

Chopping knives 22 extend laterally across the peripheral surface of hub 20 of shearing cutter 18 and may be inclined at a slight angle relative to a perpendicular lying in the peripheral surface of hub 20 and directed toward the adjacent surface of shearing cutter 18.

In accordance with the invention, the vertically superposed rotary shearing cutters 16 and 18 rotate in contiguous parallel vertical planes perpendicular to the horizontal plane of the strip 10 which is being trimmed, but canted at a slight angle relative to the direction of travel of the strip 10 in such manner that the vertical parallel contiguous planes of each pair of rotary shearing cutters 16 and 18 diverge relative to the forward direction of travel of metal strip 10. The angle of cant of the vertical planes of the rotary shearing cutters 16 and 18 relative to the direction of travel of strip 10 is represented in FIG. 1 by the angle A, the angle A being preferably in the range 0+ to 5 degrees, but may be in the range 0+ to 10 degrees. An angle of cant which has been found to be satisfactory is 4 degrees.

Expressed in a different way, the rotary shearing cutters 16 and 18 revolve about axes which lie in planes parallel to the plane of metal strip 10, but with the axes of cutters 16 and 18 canted a few degrees from a line which is perpendicular to the direction of travel of metal strip 10 and which lies in the plane of metal strip 10 or in a plane parallel thereto, the axes being so canted that the cutters diverge outwardly with respect to the direction of travel of metal strip 10.

Due to the outward canting of the rotary shearing cutters 16 and 18 at each side of strip 10 as just described, chopping cutters 22 carried by shearing cutter 18 are slightly offset laterally outwardly from the adjacent edge of the main body of strip 10 at the location where the chopping action takes place, rather than being in directly abutting relation to the main body of strip 10. The result of this slight outward displacement of cutting knives relative to the main body of strip 10 is that the chopper marks which have hitherto proved very objectionable in the metals industry are not produced by the chopping action. Furthermore, the outward thrust developed on each of the opposite edges of strip 10 pulls the strip tightly from edge to edge to produce a flat sheet free from ripples along the edge, and without the transverse bow in the strip associated with prior art apparatus. In addition, the use of the canted edge trimmer and ribbon chopping assembly hereinbefore described also results in a much smoother edge on the main body of the metal strip after trimming.

While a present preferred embodiment of the invention has been illustrated and described, it will be recognized that the invention may be otherwise variously embodied and practiced within the scope of the following claims.

What is claimed as the invention is:

1. Apparatus for trimming the marginal edge of metal strip to produce a trimmed edge substantially parallel to the direction in which the strip is advanced and for chopping the edge ribbon produced by the trimming of said strip, comprising a pair of rotary shearing cutters positioned to receive an edge to be trimmed therebetween, a chopping knife adapted for rotation with one of said cutters and disposed at the opposite side of the cutter from the major portion of the strip being trimmed, the other of said shearing cutters providing an anvil surface for cooperation with said chopping knife to sever the sheared edge ribbon into predetermined lengths, said rotary shearing cutters being mounted for rotation in contiguous parallel planes which are substantially perpendicular to the surface of the metal strip being trimmed, but so canted relative to the direction in which the strip is advanced that the cutters form an acute angle with the trimmed edge of said strip and produce a force tending to pull the strip laterally toward said cutters, and means for restraining the opposite edge of said strip, said lateral force thereby causing sufficient tension in the strip that the resulting trimmed edge is maintained free of ripples.

2. An apparatus as defined in claim 1 in which the contiguous parallel planes of said shearing cutters are canted at an angle in the range 0+ to 10 degrees.

3. Apparatus for trimming the opposite marginal edges of metal strip to produce substantially parallel trimmed edges and for chopping the edge ribbons produced by the trimming, comprising a first and a second pair of rotary shearing cutters, each of said cutter pairs being positioned adjacent one of the opposite edges of the metal strip to receive the edge to be trimmed therebetween, means associated with each of said cutter pairs for chopping the sheared edge ribbons into predetermined lengths, said rotary shearing cutters being mounted for rotation about axes lying in substantially horizontal planes parallel to the surface of the metal strip, the portions of said axes overlying the strip being canted forwardly at an acute angle to a line which is perpendicular to the direction of travel of said strip and which lies in the plane of the strip, the cutters thereby being inclined to the trimmed edge of the strip, whereby the strip is tensioned laterally by the action of said cutters and the resulting trimmed strip is maintained free of ripples along the trimmed edges.

4. Apparatus according to claim 3 wherein the angle between said shearing cutters and the trimmed edge is about four degrees.

5. Apparatus for trimming the opposite marginal edges of metal strip to produce substantially parallel trimmed edges and for chopping the edge ribbons produced by the trimming, comprising a first and a second pair of rotary shearing cutters, each of said cutter pairs being positioned adjacent one of the opposite edges of the metal strip to receive the edge to be trimmed therebetween, a chopping knife adapted for rotation with one of the shearing cutters of each pair and disposed at the opposite side of the cutter from the major portion of the strip being trimmed, the other shearing cutter of each pair providing an anvil surface for cooperation with said chopping knife to sever the sheared edge ribbon, said rotary shearing cutters being mounted for rotation about axes lying in substantially horizontal planes parallel to the surface of the metal strip, the portions of said axes overlying the strip being canted forwardly at an acute angle to a line which is perpendicular to the direction of travel of said strip and which lies in the plane of the strip, the cutters thereby being inclined to the trimmed edge of the strip, whereby the strip is tensioned laterally by the action of said cutters and the resulting trimmed strip is maintained free of ripples along the trimmed edges.

6. An apparatus as defined in claim 5 in which the contiguous parallel planes of the cutters of each pair are canted at an angle in the range 0+ to ten degrees.

References Cited in the file of this patent

UNITED STATES PATENTS

| | | |
|---|---|---|
| 1,408,415 | Smith | Feb. 28, 1922 |
| 1,964,076 | Petersen | June 26, 1934 |
| 2,056,657 | Everett | Oct. 6, 1936 |
| 2,203,738 | Nash | June 11, 1940 |

FOREIGN PATENTS

| | | |
|---|---|---|
| 507,430 | Great Britain | June 14, 1939 |